(12) United States Patent
Hashimoto

(10) Patent No.: US 11,599,712 B2
(45) Date of Patent: Mar. 7, 2023

(54) COOKING SUPPORT DEVICE, COOKING SUPPORT METHOD, AND COOKING SUPPORT PROGRAM

(71) Applicant: Cookpad Inc., Yokohama (JP)

(72) Inventor: Naoki Hashimoto, Yokohama (JP)

(73) Assignee: Cookpad Inc., Yokohama (JP)

( * ) Notice: Subject to any disclaimer, the term of this patent is extended or adjusted under 35 U.S.C. 154(b) by 0 days.

(21) Appl. No.: 17/394,537

(22) Filed: Aug. 5, 2021

(65) Prior Publication Data

US 2022/0043966 A1  Feb. 10, 2022

(30) Foreign Application Priority Data

Aug. 6, 2020 (JP) .............................. JP2020-133906

(51) Int. Cl.
| | |
|---|---|
| *G06F 40/166* | (2020.01) |
| *G06F 40/242* | (2020.01) |
| *G06F 40/279* | (2020.01) |
| *G06F 40/284* | (2020.01) |
| *G06F 40/205* | (2020.01) |

(52) U.S. Cl.
CPC .......... *G06F 40/166* (2020.01); *G06F 40/205* (2020.01); *G06F 40/242* (2020.01); *G06F 40/279* (2020.01); *G06F 40/284* (2020.01)

(58) Field of Classification Search
CPC .... G06F 40/166; G06F 40/242; G06F 40/279; G06F 40/205; G06F 40/284
See application file for complete search history.

(56) References Cited

U.S. PATENT DOCUMENTS

| 2015/0220624 A1* | 8/2015 | Bhatt | G06F 40/284 |
| | | | 707/722 |
| 2019/0042551 A1* | 2/2019 | Hwang | G06N 3/0454 |
| 2019/0311647 A1* | 10/2019 | Shete | G09B 19/00 |
| 2021/0043108 A1* | 2/2021 | Baumback | G06F 40/284 |
| 2022/0022289 A1* | 1/2022 | Singh | G06F 40/20 |

FOREIGN PATENT DOCUMENTS

| JP | 2004-294864 A | 10/2004 |
| JP | 2007-128305 A | 5/2007 |
| JP | 2019-164585 A | 9/2019 |

(Continued)

OTHER PUBLICATIONS

Miyahara Ryosuke (hereinafter Ryosuke), "Information Processing Device, Information Processing Method, and Program", Document ID: JP2019028854A, published on Feb. 21, 2019, pp. 9 (Year: 2019).*

(Continued)

*Primary Examiner* — Chau T Nguyen
(74) *Attorney, Agent, or Firm* — Oblon, McClelland, Maier & Neustadt, L.L.P.

(57) ABSTRACT

A cooking support device includes a memory that stores recipe information and processing circuitry which subjects the recipe information stored in the memory to natural language processing, extracts words related to cooking operations therefrom, classifies the words into predetermined categories representing cooking concepts, arranges the words in an order of occurrence of the cooking concepts in an entire cooking process, and generates a summary of the recipe information.

13 Claims, 8 Drawing Sheets

(56) References Cited

FOREIGN PATENT DOCUMENTS

| WO | WO-2019178372 A1 | * | 9/2019 | ........... G06F 40/237 |
| WO | WO-2020101919 A1 | * | 5/2020 | ............... G06N 3/04 |

OTHER PUBLICATIONS

Nishihara et al., "Automatic Outline-Type Summarization for Cooking Recipes", IPSJ SIG Technical Report, vol. 2013, No. 8, 2013, pp. 1-7 (with English Translation).

Shibata et al., "Automatic Summarization of Work Instructional Video by Integrating Linguistic and Video Information", The Association for Natural Language Processing, Mar. 19, 2007, pp. 598-601 (with English Translation).

* cited by examiner

[Figure 1]
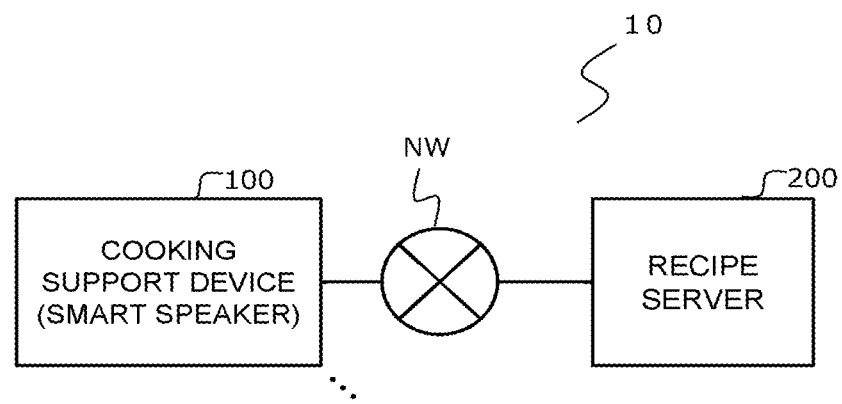

[Figure 2]
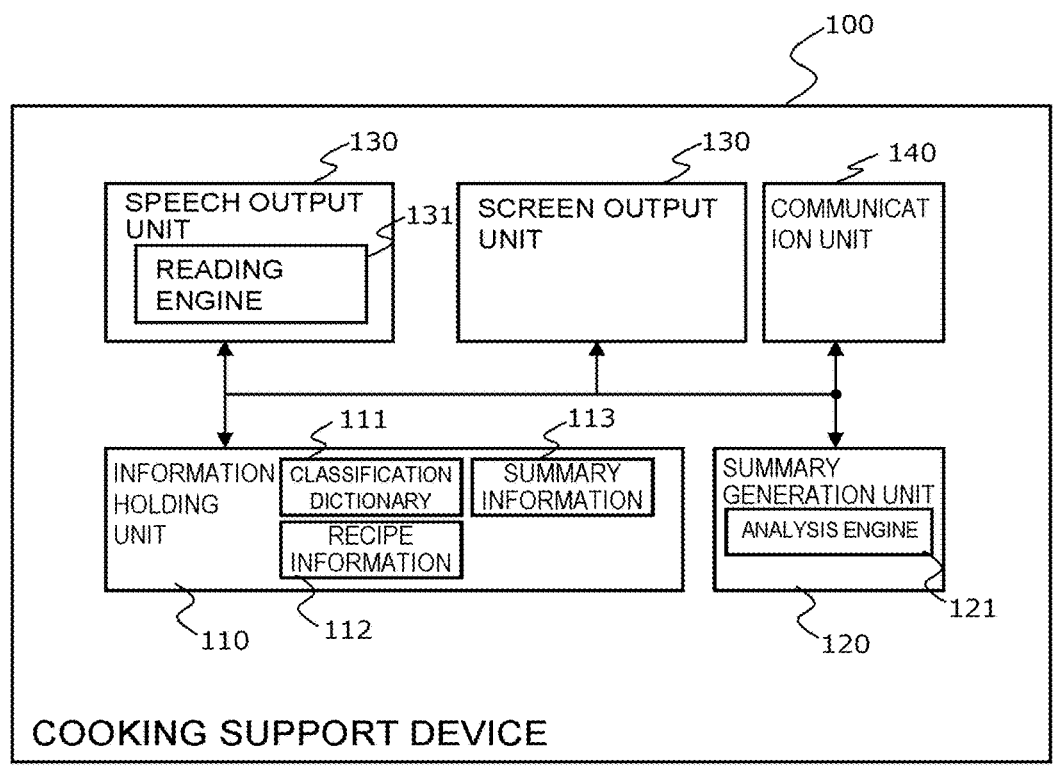

[Figure 3]

| CLASSIFICATION DICTIONARY | | | | 111 |
|---|---|---|---|---|
| CATEGORY | WORD | | | |
| | VERB | CASE PARTICLE | OBJECT | ... |
| COOKING OPERATION | CUT, WASH, SIMMER, FRY, SAUTE, DRESS, ... | WO, NI, ... | INGREDIENT, VEGETABLE, MEAT, FISH, ... | ... |
| PREPARATION | CUT, WASH, ... | WO, ... | INGREDIENT, VEGETABLE, MEAT, FISH, ... | ... |
| MAIN COOKING | SIMMER, FRY, SAUTE, ... | WO, NI, ... | INGREDIENT, VEGETABLE, MEAT, FISH, ... | ... |
| FINISH | DRESS, PUT ON, ... | WO, NI, ... | HOT WATER, PLATE, ... | ... |
| SYNONYMS 1 | STANDARD DEFINITION: CUT | | DICE, CUT, SLICE, CHOP, MINCE, ... | |
| SYNONYMS 2 | STANDARD DEFINITION: WASH | | WASH, RINSE, WASHING, WASH IN WATER, ... | |
| ... | ... | | | |

[Figure 4]

RECIPE INFORMATION

112

| RECIPE ID | GENRE | TITLE | COOKING DETAILS | DISH IMAGE | |
|---|---|---|---|---|---|
| r001 | JAPANESE | SOFT AND FLAKY NIKUJAGA | MICROWAVE AT 500 W FOR 3 MINUTES... | R001-01.dat, ... | ... |
| r002 | JAPANESE | NIKUJAGA LOVED BY ALL | CUT 3 POTATOES INTO BITE-SIZE PIECES, ... | R002-01.dat, ... | ... |
| r003 | CHINESE | ENJOY SILKY-SMOOTH SWEET AND SOUR PORK | 150 g PORK LOIN... | R003-03.dat, ... | ... |
| ... | ... | ... | ... | ... | ... |

[Figure 5]

SUMMARY INFORMATION 113

| RECIPE ID | SUMMARY | COMPONENT (COOKING CONCEPT) | | | |
| --- | --- | --- | --- | --- | --- |
| | | PREPARATION | MAIN COOKING | FINISH | |
| r002 | THIS IS A DISH MADE BY CUTTING POTATOES, CARROTS, AND BEEF, SIMMERING THEM, AND PUTTING THEM ON A PLATE. | CUTTING POTATOES, CARROTS, AND BEEF | SIMMERING | PUTTING ON A PLATE | ... |
| r003 | THIS IS A DISH MADE BY CUTTING PORK LOIN AND VEGETABLES, SAUTEING THEM, AND THICKENING THE SAUCE. | CUTTING PORK LOIN AND VEGETABLES | SAUTEING | THICKENING THE SAUCE | ... |
| ... | ... | ... | ... | ... | ... |

[Figure 6]
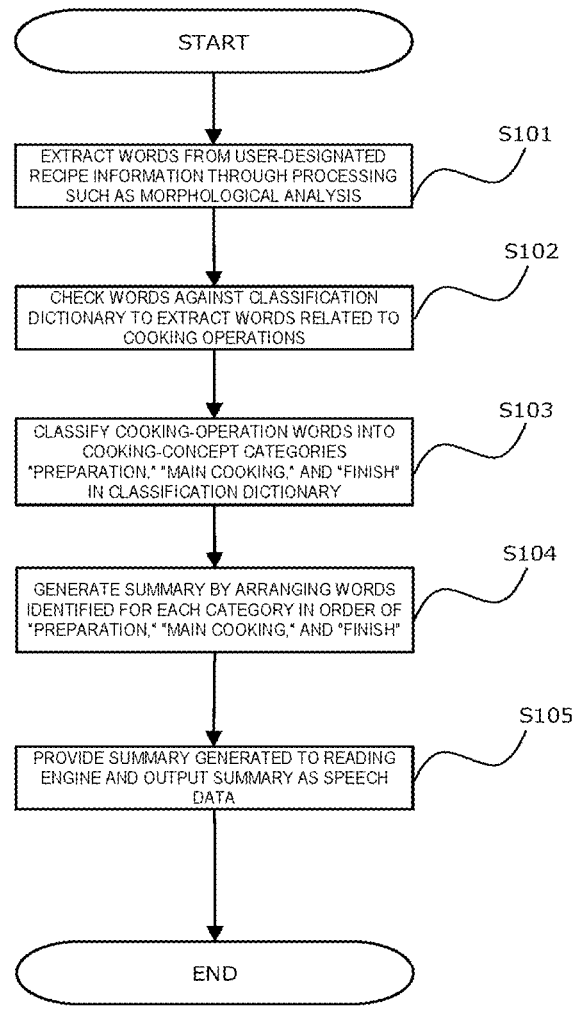

[Figure 7]

[Figure 8]
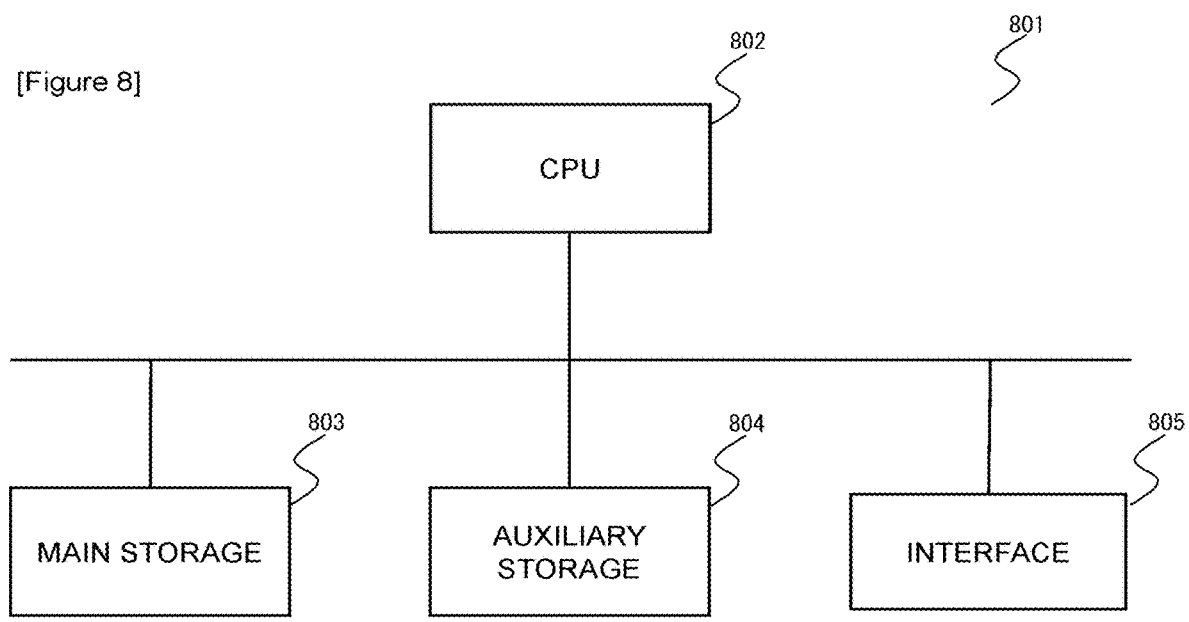

COOKING SUPPORT DEVICE, COOKING SUPPORT METHOD, AND COOKING SUPPORT PROGRAM

CROSS-REFERENCE TO RELATED APPLICATIONS

The present application is based upon and claims the benefits of priority to Japanese Application No. 2020-133906, filed Aug. 6, 2020. The entire contents of the above application is incorporated herein by reference.

BACKGROUND OF THE INVENTION

Field of the Invention

The present disclosure relates to a cooking support device, a cooking support method, and a cooking support program.

Discussion of the Background

A growing number of services have recently been providing cooking recipe information to users over networks such as the Internet. Some techniques enable cooking steps related to such recipe information to be output on a device such as a display of a cooking appliance or what is called a smart speaker.

For example, Japanese Patent Laid-Open No. 2007-128305 describes a cooking support device for supporting a cooking person's cooking works by presenting a recipe to the cooking person.

The above cooking support device includes input means for inputting skill information indicating a cooking person's cooking skill level and the types and number of the cooking person's cooking tools, and recipe information storage means that stores recipe information indicating the order of work steps of cooking and work procedure in each work step. The device also includes calculation means for performing calculation based on the skill information, the types and number of cooking tools, and the recipe information; this calculation includes calculating a work schedule that allows cooking works to be performed in a cooking time appropriate to the cooking person's skill, calculating a work procedure in each work step of the work schedule, calculating images or videos of the work procedure, and calculating an expected finish time of the cooking. The device also includes display means for displaying the work schedule, the work procedure, the images or videos of the work procedure, and the expected finish time, and speech output means for reading the work procedure.

Further, Japanese Patent Laid-Open No. 2004-29486 describes a cooking navigation device. For two cooking steps separated by a standby time, this device aims to read the earlier step, count the standby time, and automatically read the later step after a lapse of the standby time.

The above cooking navigation device includes means for generating cooking navigation data by analyzing input recipe data and extracting sentences indicating cooking steps as to-be-read sentences, and by extracting any standby time information included in the to-be-read sentences. The device also includes means for synthesizing and reading the first to-be-read sentence, and, after the first to-be-read sentence is read, synthesizing and reading the next to-be-read sentence upon every input of a cooking step output instruction through a user operation. The device also includes means for, if a to-be-read sentence includes the standby time information, starting, upon reading of the to-be-read sentence, counting a standby time indicated by the standby time information, and, if the standby time elapses with no cooking step output instruction input after the start of counting the standby time, automatically synthesizing and reading the next to-be-read sentence.

The above prior techniques will allow a user, for example a user whose hands or eyes are occupied with cooking or other housework, to know cooking steps and ingredients and then use the knowledge for later cooking. The output content provided by these techniques, however, is simply a sequential output of text data in the recipe information. Such output content does not well match the situation of a user who has difficulty in viewing or listening to a large amount of information at a time.

For example, a user with little time or mental energy may desire to obtain brief information displayed on a small display or read through a speaker. If the user has to continuously recognize lengthy cooking steps displayed or read, the user may remember only the later part of the content, which may actually lead to confusion of understanding. Thus, simply outputting the recipe information can prevent the achievement of the original aim of supporting the cooking.

SUMMARY OF THE INVENTION

An aspect of the present disclosure is to provide a cooking support device, a cooking support method, and a cooking support program that enable a user's efficient understanding of an overview of recipe information irrespective of the user's situation.

According to an aspect of the present invention, a cooking support device includes a memory that stores recipe information and processing circuitry which subjects the recipe information stored in the memory to natural language processing, extracts words related to cooking operations therefrom, classifies the words into predetermined categories representing cooking concepts, arranges the words in an order of occurrence of the cooking concepts in an entire cooking process, and generates a summary of the recipe information.

According to another aspect of the present invention, a cooking support method includes storing recipe information, and generating a summary of the recipe information by subjecting the recipe information to natural language processing, extracting words related to cooking operations therefrom, classifying the words into predetermined categories representing cooking concepts, and arranging the words in an order of occurrence of the cooking concepts in an entire cooking process.

According to still another aspect of the present invention, a non-transitory computer-readable recording medium that stores a program which when executed by a computer causes the computer to execute a method including storing recipe information, and generating a summary of the recipe information by subjecting the recipe information to natural language processing, extracting words related to cooking operations therefrom, classifying the words into predetermined categories representing cooking concepts, and arranging the words in an order of occurrence of the cooking concepts in an entire cooking process.

A cooking support device according to an aspect of the present disclosure includes: an information holding unit that holds recipe information; and a summary generation unit that generates a summary of the recipe information by subjecting the recipe information to natural language processing to extract words related to cooking operations, classifying the words into predetermined categories representing cooking concepts, and arranging the words in the order of occurrence of the cooking concepts in the entire cooking process.

A cooking support method according to an aspect of the present disclosure includes, in a cooking support device: holding recipe information; and generating a summary of the recipe information by subjecting the recipe information to natural language processing to extract words related to cooking operations, classifying the words into predetermined categories representing cooking concepts, and arranging the words in the order of occurrence of the cooking concepts in the entire cooking process.

A cooking support program according to an aspect of the present disclosure causes a cooking support device to: hold recipe information; and generate a summary of the recipe information by subjecting the recipe information to natural language processing to extract words related to cooking operations, classifying the words into predetermined categories representing cooking concepts, and arranging the words in the order of occurrence of the cooking concepts in the entire cooking process.

The cooking support device, the cooking support method, and the cooking support program can allow a user to efficiently understand an overview of recipe information irrespective of the user's situation.

Further features of the present disclosure will become apparent from the following description of exemplary embodiments with reference to the attached drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a configuration diagram showing an overview of an information processing system according to an embodiment of the present invention.

FIG. 2 is a block diagram showing a configuration of a cooking support device according to an embodiment of the present invention.

FIG. 3 is a diagram showing an exemplary configuration of a classification dictionary according to an embodiment of the present invention.

FIG. 4 is a diagram showing an exemplary configuration of recipe information according to an embodiment of the present invention.

FIG. 5 is a diagram showing an exemplary configuration of summary information according to an embodiment of the present invention.

FIG. 6 is an exemplary flowchart of a cooking support method according to an embodiment of the present invention.

FIG. 7 is a diagram showing an exemplary screen output according to an embodiment of the present invention.

FIG. 8 is a schematic block diagram showing a configuration of a computer according to an embodiment of the present invention.

DESCRIPTION OF THE EMBODIMENT

The embodiments will now be described with reference to the accompanying drawings, wherein like reference numerals designate corresponding or identical elements throughout the various drawings.

Embodiments will be described below. The following embodiments do not unnecessarily limit the scope of the present disclosure set forth in the claims. Not all of the elements described in the embodiments are essential for the present disclosure.

Configurations

FIG. 1 is a configuration diagram showing an overview of an information processing system 10 according to an embodiment of the present invention. The information processing system 10 includes a cooking support device 100 and a recipe server 200. As an exemplary implementation, the cooking support device 100 in the embodiment will be described as a smart speaker.

The cooking support device 100 and the recipe server 200 are communicatively interconnected over a wired or wireless network NW. The network NW may include a wide area network, such as the Internet or a public wireless network, or may include a local area network (LAN).

As mentioned above, the cooking support device 100 is assumed to be a smart speaker as an example. Examples of the cooking support device 100, however, may include devices such as mobile devices, personal computers (PCs), PDAs, watches, smartwatches, and head-mounted displays having speech input/output functions as in a smart speaker. If the device is not intended to provide speech output of summaries, the concept of the device may include display-equipped devices with or without speech input/output functions.

If the device is a smart speaker with a display, the device may have an operation mode in which the display shows a summary on a screen while the speaker says "Read the summary on the screen." to prompt a user to see the screen. Such an operation mode can simplify speech output while causing the user to see a summary on the display.

The recipe server 200, which is a server device operating a recipe website, holds and manages a large amount of user-posted recipe information and transmits the recipe information in response to user requests.

The cooking support device 100 stores, in an appropriate storage, recipe information obtained from the recipe server 200 in response to a user instruction. The recipe information represents a cooking method and includes information such as, for example, a user ID (indicating a person who created (posted) the recipe or who made a dish according to the recipe), the recipe name (the dish name), a cooking process, ingredients, and cooking tools.

The recipe server 200 transmits part or all of the recipe information to the cooking support device 100 in response to a request from the cooking support device 100. The cooking support device 100 applies a cooking support method according to an embodiment of the present invention to the recipe information from the recipe server 200 to generate an appropriate summary, which is then output on the screen or as speech.

The cooking support device 100 can subject the recipe information obtained from the recipe server 200 as above to natural language processing to extract words related to cooking operations. For this purpose, the cooking support device 100 may include an analysis engine for natural language processing, for example morphological analysis and part-of-speech identification in advance, or may invoke and use such an analysis engine in an external device.

The cooking support device 100 classifies the words extracted as above into predetermined categories representing cooking concepts such as "preparation," "main cooking," and "finish." The cooking support device 100 arranges the words in the order of occurrence of the cooking concepts in the entire cooking process (preparation→main cooking→finish), thereby generating a summary of the target recipe information.

The cooking support device 100 provides the summary generated as above to a reading engine and outputs the summary as speech data through a speaker (an interface to be described below). Alternatively, the cooking support device 100 outputs the summary generated as above on a screen of a display device. The cooking support device 100 may output only part of the summary related to a user-designated category.

The cooking support device 100 as above may be implemented by an information processing device, for example a computer or a mainframe and so on. As illustrated in FIG. 2, the cooking support device 100 includes an information holding unit 110, a summary generation unit 120, a speech output unit 130, a screen output unit 140, and a communication unit 150.

The information holding unit 110 stores a classification dictionary 111, recipe information 112, and summary information 113. As illustrated in FIG. 3, the classification dictionary 111 defines cooking-operation-related words potentially appearing in recipe information, and which of cooking concepts (such as preparation, main cooking, and finish) each word is associated (or unassociated) with.

Information held in the classification dictionary 111 may include, for example, a table that classifies words in each category into verb, case particle, and object. Although the example in FIG. 3 shows words belonging to object at the granularity of ingredient, vegetable, meat, fish, etc., the dictionary may define the words at a more specific granularity, such as cabbage, carrot, onion, beef, beef loin, chicken breast, yellowtail fillet, etc.

Other information held in the classification dictionary 111 may include synonym information. The example in FIG. 3 shows a synonym group including dice, cut, slice, chop, and mince, and a synonym group including wash, rinse, washing, and wash in water. Each synonym group has one standard definition, which is a word representing the synonyms in the group.

The recipe information 112 is information for making dishes, as illustrated in FIG. 4. This information is a table in which each recipe ID serving as a key uniquely identifies a recipe, and information such as the genre, the title (the dish name), cooking details, and cooking images are associated with the recipe ID. The cooking details include information described for each cooking step, such as ingredients, tools and appliances used, and cooking operations. The cooking images, which may be images of the dish cooked or in the process of cooking, for example, are not essential for the embodiments of the present invention.

Each piece of recipe information as above may be content that includes images, videos, and text of a corresponding dish. The recipe information to be transmitted to the cooking support device 100 may be posted by users (posters or viewers) or a service provider.

The summary information 113 is a table that stores summaries generated by the summary generation unit 120. The summary generation unit 120 in the cooking support device 100 generates the summary information 113 in the following manner. The summary generation unit 120 subjects text data of the cooking details in each record, i.e., each recipe, in the recipe information 112 to word extraction performed by an analysis engine 121 that supports morphological analysis and part-of-speech identification. The summary generation unit 120 then classifies extracted words into cooking concepts. The summary generation unit 120 arranges the words in the order of occurrence of the cooking concepts in the entire cooking process.

In classifying words to generate a summary, the summary generation unit 120 performs the following processing for words extracted from the cooking details in the recipe information. The summary generation unit 120 identifies, among the words extracted, only words that appear in the range from the start of the cooking and before the first heating processing, and that belong to the "preparation" category in the classification dictionary 111. The summary generation unit 120 identifies, among the words extracted, only words that appear in the range from the first heating processing to the last heating processing, and that belong to the "main cooking" category in the classification dictionary 111. The summary generation unit 120 identifies, among the words extracted, only words that appear in the range after the last heating processing, and that belong to the "finish" category in the classification dictionary 111.

It can be said that, in the above processing, the summary generation unit 120 attempts to increase the accuracy of the summary by optimizing the summarization for each of the cooking-concept categories (preparation, main cooking, and finish). More specifically, for the category "preparation" for example, the classification dictionary 111 defines verb words that only correspond to concepts such as "change the shape" and "wash" so that only words related to this category are extracted. Similarly, for the category "finish," the classification dictionary 111 defines verb words that only correspond to concepts such as "put on a plate" and "dress." This achieves control in which words other than such category-specific words are not extracted as elements of the summary, i.e., are excluded from the summary.

In addition to extracting words from the cooking details in the recipe information and categorizing the words as described above, the summary generation unit 120 may further optimize the summary by reducing the amount of text generated as the summary.

For this optimization, the summary generation unit 120 may perform control as follows. In the above processing of identifying words in the cooking details corresponding to ingredients with reference to, e.g., the classification dictionary 111, the summary generation unit 120 may limit the number of words identified to a predetermined number. That is, more than the predetermined number of words corresponding to ingredients are not extracted and thus ignored. The summary generation unit 120 may also perform control of identifying words in the cooking details corresponding to seasonings with reference to the classification dictionary 111, and avoiding extracting these words. That is, words corresponding to seasonings are excluded from words to constitute the summary.

The summary generation unit 120 may further perform control for reducing the amount of text of the summary as follows. For example, in generating the summary by arranging the words extracted, the summary generation unit 120 may unify expressions in the summary by connecting words corresponding to cooking verbs extracted for each category to words corresponding to ingredients extracted for the category. This control of unifying the expressions eliminates the need to compose sentences reflecting different writing styles, thereby increasing the processing efficiency. The summary generated in this manner also facilitates the user's understanding of the content of the summary.

The summary generation unit 120 may also perform control for reducing the amount of text of the summary as follows. For example, the summary generation unit 120 may check verb words in the extracted words against a synonym group defined in the classification dictionary 111. The summary generation unit 120 may then unify the expressions of synonymous verb words into one of the expressions, or into a standard expression defined in the classification dictionary 111.

The summary information 113 is thus generated by the summary generation unit 120. For each piece of recipe information, the summary information 113 includes a recipe ID serving as a key, and the summary and the summary components associated with the recipe ID. A specific example of this information shown in FIG. 5 includes summaries "This is a dish made by cutting potatoes, carrots, and beef, simmering them, and putting them on a plate." and "This is a dish made by cutting pork loin and vegetables, sauteing them, and thickening the sauce."

Functions of Cooking Support Device

Now, functions of the cooking support device 100 will be described. The summary generation unit 120 in the cooking support device 100 subjects the "cooking details" in the recipe information 112 to natural language processing performed by the analysis engine 121 and extracts words corresponding to verbs, case particles, and objects. From these words, the summary generation unit 120 extracts, as words related to cooking operations, words belonging to the "cooking operation" category in the classification dictionary 111.

The summary generation unit 120 classifies the cooking-operation words extracted as above into the cooking-concept categories "preparation," "main cooking," and "finish" in the classification dictionary 111.

For example, the cooking details may go like "Cut 3 potatoes into bite-size pieces, . . . , put them into 300 ml of water, cook over a medium heat for 20 minutes and remove scum. Add soy sauce and bonito stock, and simmer over a low heat until the carrots are softened, . . . . Put on a plate." From these cooking details, objects "potatoes," "carrots," and "beef," and a verb "cut" are identified as words that appear in the range from the start of the cooking and before the first heating processing "over a medium heat" and that belong to the "preparation" category in the classification dictionary 111.

In the above processing of identifying object words in the cooking details corresponding to ingredients with reference to the classification dictionary 111, the summary generation unit 120 limits the number of words identified to a predetermined number. That is, more than the predetermined number of words corresponding to ingredients are not extracted and thus ignored. The summary generation unit 120 also avoids extracting words in the cooking details corresponding to seasonings, which are not defined in the classification dictionary 111. That is, words corresponding to seasonings are excluded from words to constitute the summary.

Similarly, the summary generation unit 120 identifies an object "carrots" and a verb "simmer" as words that appear in the range from the first heating processing "over a medium heat" to the last heating processing "over a low heat" and that belong to the "main cooking" category in the classification dictionary 111.

Similarly, the summary generation unit 120 identifies a verb "put on a plate" as a word that appears in the range after the last heating processing "over a low heat" and that belongs to the "finish" category in the classification dictionary 111.

The summary generation unit 120 generates a summary of the target recipe by arranging the words identified for each category as above in the order "preparation," "main cooking," and "finish" (the order of occurrence of the cooking concepts in the entire cooking process). In the example in FIG. 5, this yields a summary "This is a dish made by cutting potatoes, carrots, and beef, simmering them, and putting them on a plate."

Because "carrots" are associated with "simmer" in the cooking details, the resulting summary would include "simmer the carrots . . ." However, to avoid overlap with the preceding clause "potatoes, carrots . . . ," control is performed for omitting "carrots" for "simmer." For a more natural sentence, "carrots" omitted for avoiding the overlap may be replaced with a demonstrative "them."

The summary generation unit 120 may apply the text data on the cooking details in the recipe information 112 to a predetermined recipe format, thereby identifying parts unrelated to the cooking process. The summary generation unit 120 may thus proactively exclude these parts from the target of word extraction.

For example, the recipe format may define areas where the cooking process is written, and surrounding areas where the recipe creator is introduced and where the taste and texture are described, and may define characteristics of words and clauses in these areas.

The speech output unit 130 provides the summary generated by the summary generation unit 120 to a reading engine 131 and outputs the summary as speech data through an interface (a speaker) to be described below. The reading engine 131 is inherent in the cooking support device 100, which is a smart speaker.

The screen output unit 140, as with the speech output unit 130, outputs the data on the summary generated by the summary generation unit 120 to a display and displays the summary on a screen. When the summary is output to the display in this manner, the above speech output unit 130 more advantageously outputs a voice message for guiding the user's focus to the screen display.

The user can then see, in a timely manner, the summary that briefly describes the cooking details on the display, and this will further facilitate the user's efficient understanding of the recipe. The cooking support device 100, in turn, can simplify the content of the speech that is output by the speech output unit 130, thereby reducing the overall processing load.

The communication unit 150 in the cooking support device 100 is a communication interface that communicates with the recipe server 200 over the network NW. The communication unit 150 receives recipe information transmitted from the recipe server 200.

Flow of Process

Now, operations of the cooking support device 100 according to an embodiment of the present disclosure will be described with reference to a flowchart shown in FIG. 6. The flowchart in FIG. 6 mainly shows operations in the cooking support device 100.

At step S101, the summary generation unit 120 in the cooking support device 100 extracts text data on "cooking details" from recipe information 112, for example designated by the user through an interface or the user's terminal. The summary generation unit 120 inputs the text data to the analysis engine 121 to perform processing such as morphological analysis and part-of-speech identification. This processing allows words corresponding to verbs, case particles, and objects to be extracted.

At step S102, the summary generation unit 120 checks the words extracted at above step S101 against the words specified for the "cooking operation" category in the classification dictionary 111, thereby extracting words matching these specified words as words related to cooking operations. Specifically, words such as "potatoes," "carrots," "beef," "cut," "simmer," and "put on a plate" may be extracted.

At step S103, the summary generation unit 120 classifies the cooking-operation words extracted at above step S102 into the cooking-concept categories "preparation," "main cooking," and "finish" in the classification dictionary 111.

For example, words may be obtained from the text data on the cooking details "Cut 3 potatoes into bite-size pieces, . . . , put them into 300 ml of water, cook over a medium heat for 20 minutes and remove scum. Add soy sauce and bonito stock, and simmer over a low heat until the carrots are softened, . . . . Put on a plate." of the user-designated recipe. From the words obtained, objects "potatoes," "carrots," and "beef" and a verb "cut" are identified as words that appear in the range from the start of the cooking and before the first heating processing "over a medium heat" and that belong to the "preparation" category in the classification dictionary 111.

Similarly, objects "potatoes," "carrots," and "beef," and a verb "simmer" are identified as words that appear in the range from the first heating processing "over a medium heat" to the last heating processing "over a low heat" and that belong to the "main cooking" category in the classification dictionary 111.

Similarly, a verb "put on a plate" is identified as a word that appears in the range after the last heating processing "over a low heat" and that belongs to the "finish" category in the classification dictionary 111.

At above step S103, at which the classification dictionary 111 is used to identify object words (potatoes, carrots, and beef) in each category corresponding to ingredients, the summary generation unit 120 limits the number of words identified to a predetermined number. That is, more than the predetermined number of words corresponding to ingredients are not extracted and thus ignored.

The summary generation unit 120 also avoids extracting words in the cooking details corresponding to seasonings, which are not defined in the classification dictionary 111. That is, words corresponding to seasonings are excluded from words to constitute the summary.

At step S104, the summary generation unit 120 generates a summary of the target recipe by arranging the words identified for each category as above in the order of "preparation," "main cooking," and "finish" (the order of occurrence of the cooking concepts in the entire cooking process). In the example in FIG. 5, this yields a summary "This is a dish made by cutting potatoes, carrots, and beef, simmering them, and putting them on a plate".

The summary generation unit 120 may reduce the amount of text of the summary as follows. For example, in generating the summary by arranging the words extracted, the summary generation unit 120 may unify expressions in the summary by connecting words corresponding to cooking verbs extracted for each category to words corresponding to ingredients extracted for the category. This control of unifying the expressions eliminates the need to compose sentences reflecting different writing styles, thereby increasing the processing efficiency. The summary generated in this manner also facilitates the user's understanding of the content of the summary.

The summary generation unit 120 may also perform control for reducing the amount of text of the summary as follows. For example, the summary generation unit 120 may check verb words in the extracted words against a synonym group defined in the classification dictionary 111. The summary generation unit 120 may then unify the expressions of synonymous verb words into one of the expressions, or into a standard expression defined in the classification dictionary 111.

The summary generation unit 120 may apply the text data on the cooking details in the recipe information 112 to a predetermined recipe format, thereby identifying parts unrelated to the cooking process. The summary generation unit 120 may thus proactively exclude these parts from the target of word extraction.

For example, the recipe format may define areas where the cooking process is written, and surrounding areas where the recipe creator is introduced and where the taste and texture are described, and may define characteristics of words and clauses in these areas.

At step S105, the speech output unit 130 provides the summary generated by the summary generation unit 120 at the steps up to S104 to the reading engine 131 and outputs the summary as speech data through an interface (a speaker). The reading engine 131 is inherent in the cooking support device 100, which is a smart speaker.

The speech output unit 130 may receive a summary reading instruction from an interface or the user's terminal. The speech output unit 130 may then provide, to the reading engine 131, a part in the summary corresponding to a category (at least one of preparation, main cooking, and finish) designated in the summary reading instruction, and output the part as speech data.

Implementing the above function enables exactly fulfilling the user's needs by providing speech output of only a part that the user actually desires to know, while improving the processing efficiency of the cooking support device 100. In another possible implementation, the speech output unit 130 may receive, through an interface (FIG. 8) to be described below, a question from the user about what the user desires to know, and answer the question based on the summary.

In the above implementation, for example, the user may speak "Where should I simmer in the process?" using an interface 805 (FIG. 8). The speech output unit 130 then identifies the category "main cooking" that includes the concept "simmer" among the components (cooking concepts) in the information on the target recipe in the summary information 113. Based on this identification, the speech output unit 130 outputs speech such as "You are to simmer once. You are to simmer potatoes (carrots and beef)." If the above identification suggests multiple "simmer" steps, the speech output unit 130 outputs speech such as "First, you are to simmer . Next, you are to simmer ." in the order of the multiple steps identified.

The summary generation unit 120 in the above cases may generate a new summary specific to a user-designated category. In this process, the summary generation unit 120 may generate a summary that describes cooking steps constituting the user-designated category, i.e., cooking concept, at a granularity finer than that of the summary of the entire recipe.

For example, assume that a summary for the "main cooking" category is requested in the above example. The summary of the entire recipe describes "main cooking" simply as "simmer." A new summary generated in response to the request may describe "main cooking" at a finer granularity, for example as "Add soy sauce and bonito stock to the contents of the pot after the scum is removed, and simmer over a low heat."

For finer summary granularities, the summary generation unit 120 can add words unrelated to heating processing to the summary. For example, the verb "add" in "Add soy sauce and bonito stock" is unrelated to heating processing and is therefore to be deleted from the summary. The seasonings "soy sauce and bonito stock" are also to be omitted. However, for finer (e.g., user-designated) summary granularities, the summary generation unit 120 may perform control of associating the verb "add" and the objects "soy sauce and bonito stock" to the verb "simmer" related to the nearest heating processing so that these verb and objects are included in the summary. In this control, the summary generation unit 120 performs the following processing when checking the words in the cooking details of the recipe against the classification dictionary 111 to identify words for each category. That is, the summary generation unit 120 identifies words that are not defined in the classification dictionary 111 and that correspond to verbs and objects (such as seasonings) predefined in the information holding unit 110 for the target granularity, and uses these words in arranging the elements of the summary as described above.

Generating a new summary for a specific category as above may also include the following processing. For example, some of the verbs, case particles, and objects in the record of the designated category in the classification dictionary 111 might be excluded from the summary of the entire recipe (e.g., an object representing a product resulting from the preceding preparation cannot be used for the summary of the entire recipe due to mismatch with a verb or a case particle in the main cooking). Such words excluded from the summary of the entire recipe may be used for the category-specific summary to increase the granularity.

In another embodiment, as with the speech output unit 130, the screen output unit 140 may output data on the summary generated by the summary generation unit 120 to a display and display the summary on a screen (see a screen G100 in FIG. 7). When the summary is output to the display in this manner, the speech output unit 130 more advantageously outputs a voice message (e.g., "See the summary displayed on the screen.") for guiding the user's focus to the screen display.

The user can then see, in a timely manner, the summary that briefly describes the cooking details on the display, and this will further facilitate the user's efficient understanding of the recipe. The cooking support device 100, in turn, can simplify the content of the speech that is output by the speech output unit 130, thereby reducing the overall processing load. As a further advantageous effect, simplifying the speech output of the speech (the speech output) will enable the user to effortlessly hear the content of the summary.

Cooking Support Program

FIG. 8 is a schematic block diagram showing a configuration of a computer 801. The computer 801 includes a CPU 802, a main storage 803, an auxiliary storage 804, and an interface 805.

The following describes details of a cooking support program for carrying out the functions of the cooking support device 100 according to an embodiment.

The cooking support device 100 is implemented in the computer 801. Operations of the components of the cooking support device 100 are stored in the form of a program in the auxiliary storage 804. The CPU 802 reads the cooking support program from the auxiliary storage 804 and loads the program into the main storage 803, thereby performing the above-described processing according to the cooking support program. The CPU 802 allocates, according to the cooking support program, a storage area in the main storage 803 to the above-described storage unit.

Specifically, the cooking support program in the computer 801 causes the computer 801 to hold recipe information, and to generate a summary of the recipe information by subjecting the recipe information to natural language processing to extract words related to cooking operations, classifying the words into predetermined categories representing cooking concepts, and arranging the words in the order of occurrence of the cooking concepts in the entire cooking process.

The auxiliary storage 804 is an example of a non-transitory tangible medium. Other examples of the non-transitory tangible medium include a magnetic disk, magneto-optical disk, CD-ROM, DVD-ROM, and semiconductor memory connected via the interface 805. If the cooking support program is distributed to the computer 801 over the network NW, the computer 801 receiving the cooking support program may load the program into the main storage 803 and perform the above-described processing.

The cooking support program may be a program for carrying out some of the above-described functions. Further, the cooking support program may be what is called a differential file (a differential program) that carries out the above-described functions in combination with other programs stored in the auxiliary storage 804.

While some embodiments of the present disclosure have been described, these embodiments may be carried out in various other forms and allows various eliminations, substitutions, and modifications without departing from the spirit of the invention. These embodiments and their variations are intended to be within the scope and spirit of the invention, as well as within the features set forth in the claims and equivalents of the features.

Further, according to the above-described exemplary embodiment, although a case is described in which the present disclosure is applied to a digital camera, the present disclosure is not limited to this example. For example, the present disclosure can be applied to any apparatus, as long as the apparatus is capable of displaying all or a part of a plurality of selectable items on a screen, and selecting an item from among the plurality of items by a touch operation. More specifically, the present disclosure can be applied to apparatuses such as a personal computer, a personal digital assistant (PDA), a mobile phone terminal, a portable image viewer, a printer apparatus including a display, a digital photo frame, a music player, a game console, an electronic book reader, a tablet terminal, and the like.

Aspects of the present disclosure can also be realized by a computer of a system or apparatus (or devices such as a CPU, a micro processing unit (MPU), or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A cooking support device, comprising:
a memory configured to store recipe information; and
processing circuitry configured to
subject the recipe information stored in the memory to natural language processing,
extract, from the recipe information, words related to cooking operation,
classify the words into predetermined categories representing cooking concepts,
arrange the words in an order of occurrence of the cooking concepts in an entire cooking process to generate a summary of the recipe information, and
provide the summary to a reading device and output the summary as speech data, wherein,
in extraction of the words related to cooking operations, the processing circuitry is further configured to
perform at least one of: processing that limits a number of extracted words corresponding to ingredients to a predetermined number, and processing that avoids extraction of words corresponding to seasonings based on a predetermined classification dictionary, wherein
the processing circuitry is configured to classify the words by being further configured to:
identify, among the words extracted, only words that appear in a range from start of cooking and before first heating processing and that belong to a preparation category in the predetermined classification dictionary,
identify, among the words extracted, only words that appear in a range from the first heating processing to last heating processing and that belong to a main cooking category in the predetermined classification dictionary, and
identify, among the words extracted, only words that appear in a range after the last heating processing and that belong to a finish category in the predetermined classification dictionary.

2. The cooking support device according to claim 1, wherein, in extraction of the words related to cooking operations, the processing circuitry is further configured to
identify, based on a predetermined recipe format, a part in the recipe information unrelated to a cooking process, and
exclude from the part in the extraction.

3. The cooking support device according to claim 1, wherein the processing circuitry is further configured to generate the summary by being further configured to perform at least one of: processing of unifying expressions by connecting words corresponding to cooking verbs to words corresponding to ingredients, and processing of unifying variations in expression of the cooking verbs based on the predetermined classification dictionary maintained.

4. The cooking support device according to claim 1, wherein the processing circuitry is further configured to
receive a summary reading instruction from a user through an interface,
provide, to the reading device, a part of the summary corresponding to a category designated in the summary reading instruction, and
output the part as speech data.

5. The cooking support device according to claim 1, wherein the processing circuitry is further configured to provide screen output of the summary on a display device.

6. The cooking support device according to claim 5, wherein the processing circuitry is further configured to
provide, along with the screen output of the summary on the display device, notification speech data about the screen output to a reading device and
output the notification speech data as speech.

7. A cooking support method, comprising:
storing recipe information; and
generating a summary of the recipe information by
subjecting the recipe information to natural language processing,
extracting words, from the recipe information, related to cooking operations,
classifying the words into predetermined categories representing cooking concepts,
arranging the words in an order of occurrence of the cooking concepts in an entire cooking process, and
providing the summary to a reading device and outputting the summary as speech data, wherein
the extracting further includes:
performing at least one of: processing that limits a number of extracted words corresponding to ingredients to a predetermined number, and processing that avoids extraction of words corresponding to seasonings based on a predetermined classification dictionary, wherein
the classifying includes
identifying, among the words extracted, only words that appear in a range from start of cooking and before first heating processing and that belong to a preparation category in the predetermined classification dictionary,
identifying, among the words extracted, only words that appear in a range from the first heating processing to last heating processing and that belong to a main cooking category in the predetermined classification dictionary, and
identifying, among the words extracted, only words that appear in a range after the last heating processing and that belong to a finish category in the predetermined classification dictionary.

8. The cooking support method according to claim 7, wherein the extracting further includes:
identifying, based on a predetermined recipe format, a part in the recipe information unrelated to a cooking process, and
excluding from the part in the extraction.

9. The cooking support method according to claim 7, wherein the generating the summary further includes performing at least one of:
processing of unifying expressions by connecting words corresponding to cooking verbs to words corresponding to ingredients, and processing of unifying variations in expression of the cooking verbs based on the predetermined classification dictionary maintained.

10. The cooking support method according to claim 7, further comprising:
receiving a summary reading instruction from a user through an interface, providing, to the reading device, a part of the summary corresponding to a category designated in the summary reading instruction, and outputting the part as speech data.

11. The cooking support method according to claim 7, further comprising:

providing screen output of the summary on a display device.

12. The cooking support method according to claim 11, further comprising:

providing, along with the screen output of the summary on the display device, notification speech data about the screen output to a reading device, and outputting the notification speech data as speech.

13. A non-transitory computer-readable recording medium that stores a program which when executed by a computer causes the computer to execute a method comprising:

stores recipe information; and generating a summary of the recipe information by subjecting the recipe information to natural language processing, extracting words, from the recipe information, related to cooking operations, classifying the words into predetermined categories representing cooking concepts, arranging the words in an order of occurrence of the cooking concepts in an entire cooking process, and providing the summary to a reading device and outputting the summary as speech data, wherein the extracting further includes:

performing at least one of: processing that limits a number of extracted words corresponding to ingredients to a predetermined number, and processing that avoids extraction of words corresponding to seasonings based on a predetermined classification dictionary, wherein the classifying includes identifying, among the words extracted, only words that appear in a range from start of cooking and before first heating processing and that belong to a preparation category in the predetermined classification dictionary, identifying, among the words extracted, only words that appear in a range from the first heating processing to last heating processing and that belong to a main cooking category in the predetermined classification dictionary, and identifying, among the words extracted, only words that appear in a range after the last heating processing and that belong to a finish category in the predetermined classification dictionary.

\* \* \* \* \*